(No Model.)
P. KRUMSCHEID.
FABRIC FOR BICYCLE TIRES.
No. 584,690.  Patented June 15, 1897.
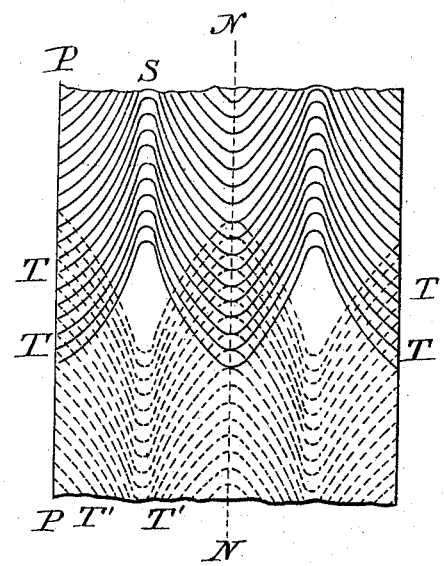
Witnesses:
Peter J. Berlo
Chas. J. Hasson
Inventor.
Peter Krumscheid

UNITED STATES PATENT OFFICE.

PETER KRUMSCHEID, OF BOSTON, MASSACHUSETTS.

FABRIC FOR BICYCLE-TIRES.

SPECIFICATION forming part of Letters Patent No. 584,690, dated June 15, 1897.

Application filed June 20, 1896. Serial No. 596,342. (No specimens.)

*To all whom it may concern:*

Be it known that I, PETER KRUMSCHEID, of Boston, in the county of Suffolk and State of Massachusetts, have invented a new and useful Improvement in Fabrics for Bicycle-Tires, of which the following, taken in connection with the accompanying drawing, is a specification.

My invention relates to a fabric especially adapted for bicycle-tires, but the fabric may be applied to other uses.

The invention consists in the above product, being a new elastic unwoven sheet the elasticity of which is different on different lines—that is, in some directions the sheet is almost totally inelastic, while in other directions it is very elastic.

The characteristics of my invention are shown in the accompanying drawing.

The drawing that I have used to illustrate my improved fabric is diagrammatic in its nature and is intended to show the relative positions of the threads in the fabric.

In the manufacture of my fabric I proceed as follows: A sheet of thin rubber has applied to each of its sides threads alined substantially as shown in the drawing. Said threads are pressed into the sheet-rubber so as to be held in place by it. The threads of one side of the sheet are represented in the drawing by full lines T T and the threads of the other side by dotted lines T' T'. The several threads of the opposite sides cross each other at varying angles, as shown in the drawing. The piece shown in the drawing is supposed to be cut crosswise from a long sheet. The width of the sheet should be so great as to admit of cutting a strip crosswise that will be long enough for a tire. The width of the tire-strip is represented on the drawing by the lines P P and N N.

My object in placing the threads in the manner shown is to obtain two of the most essential features in a good tire—viz., elasticity longitudinally and laterally (greater in the former) and perfect rigidity. The latter prevents the tire from swaying or rolling from side to side while riding. The first I obtain by crossing the threads at an acute angle on the middle line, the second by crossing them at an obtuse angle. The angles vary gradually from acute on the middle line to right angles on the sides. This arrangement of the angles also imparts to the tire a gradually-increasing resisting power to absorb the force of a sudden shock while riding over rough roads, it being greatest at a point nearest to where the tire comes in contact with the rim.

In my method the rubber serves a double purpose—viz., to lock the threads and layers together and to equalize the tension on the threads. The threads pulling in opposite directions compress the rubber between them, which relieves them of some of the strain. The latter office it could not perform if one system of threads ran straight across the tire.

I claim—

As a new article of manufacture a fabric consisting of a sheet of gum having embedded in its sides, series of threads curved so as to form U-shaped lines the ends of the threads being at the edges of the fabric and the bow part at the middle the threads being so located that the lines on one side of the fabric cross those of the other side at an angle, the angles at the edge of the fabric being obtuse and those at the center acute whereby the greatest longitudinal elasticity is obtained at the center and the greatest lateral elasticity is obtained at the edges, substantially as and for the purpose set forth.

In testimony whereof I have signed my name to this specification, in the presence of two subscribing witnesses, on this 29th day of May, A. D. 1896.

PETER KRUMSCHEID.

Witnesses:
FRANK G. PARKER,
G. F. BROWN.